US012611690B2

(12) United States Patent
Faers et al.

(10) Patent No.: US 12,611,690 B2
(45) Date of Patent: Apr. 28, 2026

(54) SPRAY UNIT

(71) Applicant: BAYER AKTIENGESELLSCHAFT, Leverkusen (DE)

(72) Inventors: Malcolm Faers, Düsseldorf (DE); Yoshitaka Sato, Tokyo (JP); Andrew Charles Chapple, Langenfeld (DE)

(73) Assignee: BAYER AKTIENGESELLSCHAFT, Leverkusen (DE)

( * ) Notice: Subject to any disclaimer, the term of this patent is extended or adjusted under 35 U.S.C. 154(b) by 702 days.

(21) Appl. No.: 17/797,403

(22) PCT Filed: Jan. 21, 2021

(86) PCT No.: PCT/EP2021/051237
§ 371 (c)(1),
(2) Date: Aug. 3, 2022

(87) PCT Pub. No.: WO2021/156061
PCT Pub. Date: Aug. 12, 2021

(65) Prior Publication Data
US 2023/0081762 A1     Mar. 16, 2023

(30) Foreign Application Priority Data
Feb. 5, 2020     (EP) .................................... 20155552

(51) Int. Cl.
*B05B 13/00*          (2006.01)
*A01M 7/00*          (2006.01)
(Continued)

(52) U.S. Cl.
CPC ......... *B05B 13/005* (2013.01); *A01M 7/0028* (2013.01); *A01M 7/005* (2013.01);
(Continued)

(58) Field of Classification Search
USPC ......... 118/321, 323, 712, 679–682; 239/223, 239/224.3, 224
See application file for complete search history.

(56) References Cited

U.S. PATENT DOCUMENTS 3,843,054  A     10/1974   Kendall et al.
4,360,155  A     11/1982   Hubbell et al.
(Continued)

FOREIGN PATENT DOCUMENTS

CN          208512830 U   *   2/2019   ........... B05B 3/1021

OTHER PUBLICATIONS

English Translation CN-208512830-U (Year: 2018).*

*Primary Examiner* — Yewebdar T Tadesse
(74) *Attorney, Agent, or Firm* — Harness, Dickey & Pierce, P.L.C.

(57)          ABSTRACT

The invention relates to a spray unit (10) with an axle (20), an atomising disc (30), a spray direction modifying assembly (40), and a liquid applicator (50). The atomising disc is configured to spin about the axle centred on the centre of the disc. The liquid applicator is configured to apply liquid to a surface of the atomising disc. The spray direction modifying assembly is in proximity to the atomising disc. The spray direction modifying assembly comprises at least one air channel (41). The at least one air channel is configured to provide air in proximity to the atomising disc to modify the subsequent trajectory of the liquid droplets that leave the outer edge of the atomising disc.

19 Claims, 9 Drawing Sheets

(51) Int. Cl.
    *B05B 3/10*         (2006.01)
    *B64D 1/18*       (2006.01)
    *B64U 101/40*     (2023.01)
    *B64U 101/45*     (2023.01)

(52) U.S. Cl.
    CPC ........ *A01M 7/0082* (2013.01); *A01M 7/0089*
        (2013.01); *B05B 3/105* (2013.01); *B05B*
    *3/1092* (2013.01); *B64D 1/18* (2013.01); *B64U*
        *2101/40* (2023.01); *B64U 2101/45* (2023.01)

(56)                 References Cited

U.S. PATENT DOCUMENTS

| | | | |
|---|---|---|---|
| 5,529,246 A | 6/1996 | Saito et al. | |
| 6,458,424 B1 * | 10/2002 | Yoshida | B05B 12/1463 |
| | | | 427/427.2 |
| 2012/0118996 A1 * | 5/2012 | Ballu | B05B 3/1092 |
| | | | 239/311 |
| 2015/0140235 A1 * | 5/2015 | Meier | B05B 3/1092 |
| | | | 118/323 |

* cited by examiner (20)

(50)

(41,42)

(30)

(40)

(10)

(20)

(50)

(41,42)

(40)    (30)

(10)

(41,42)

(40)

(41,42)

(40)

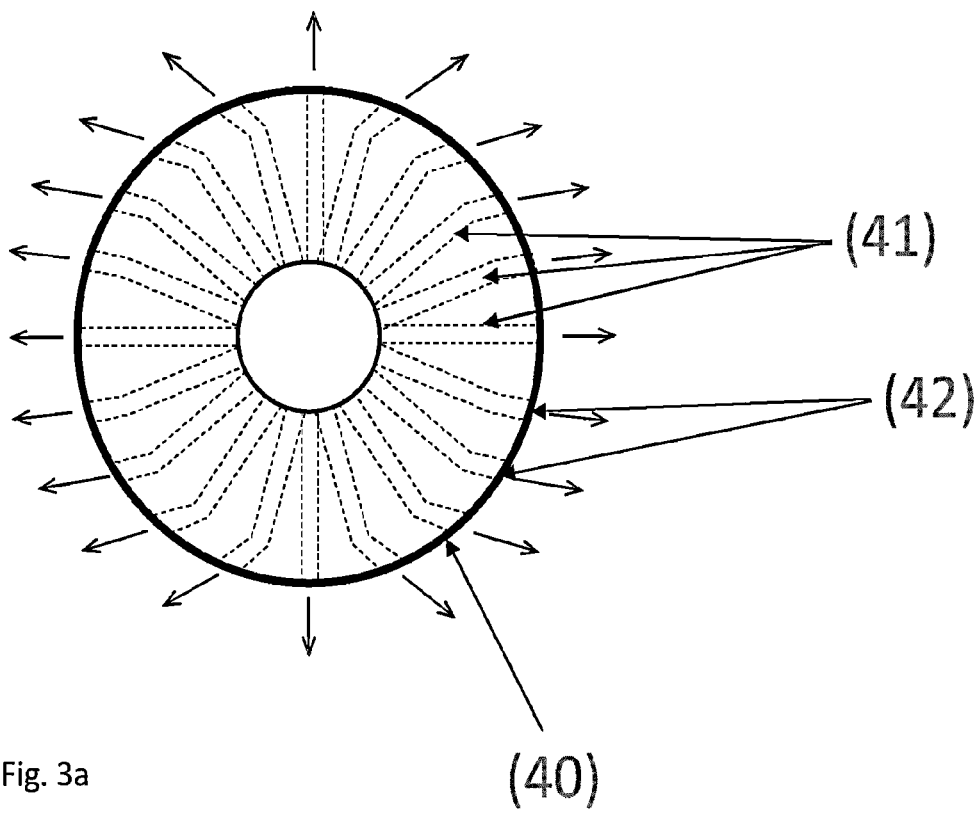
Fig. 3a                                    (40)
(41)
(42)
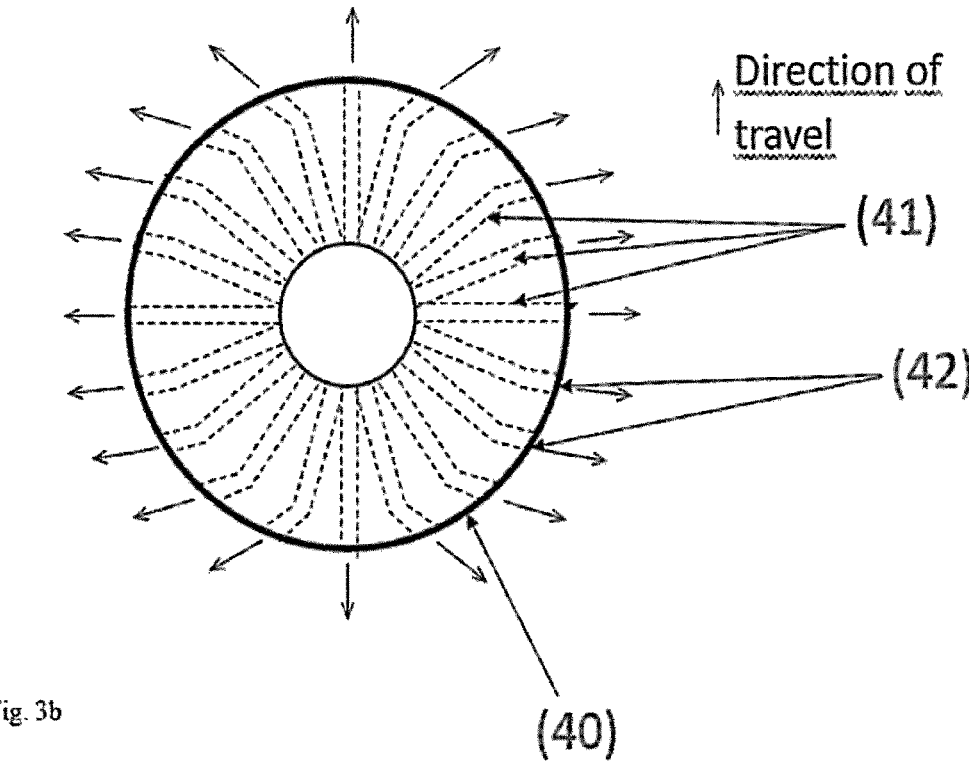
Fig. 3b                                    (40)
Direction of travel
(41)
(42)

a)

100

10

130

30

40

High air flow

/ large droplet size b)

100

10

130

30

40

Low air flow

/ small droplet size

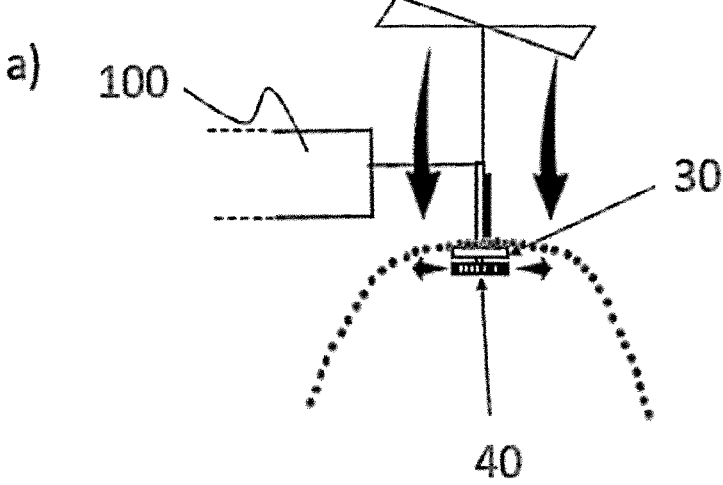
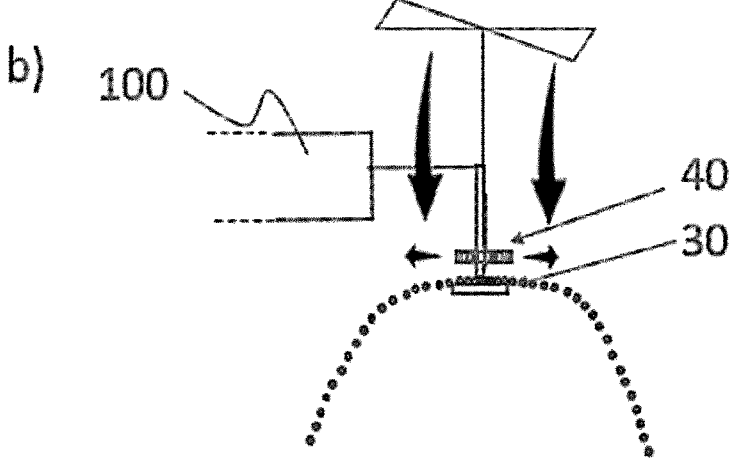
Fig. 9

SPRAY UNIT

CROSS-REFERENCE TO RELATED APPLICATIONS

This application is a U.S. national stage filing under 35 U.S.C. § 371 of International Application No. PCT/EP2021/051237, filed on Jan. 21, 2021, which claims the benefit of and priority to European Application No. 20155552.1, filed on Feb. 5, 2020. The entire disclosure of each of the above applications is incorporated herein by reference.

FIELD OF THE INVENTION

The present invention relates to spray unit and to a vehicle having such a spray unit.

BACKGROUND OF THE INVENTION

The application of crop protection products to crops is typically achieved by spray application where the atomisation device is commonly a hydraulic spray nozzle, rotating disc or cage, or an air-shear device. The properties of the atomisation device are very important for the effective application of the crop protection product to crop foliage, especially regarding the droplet sizes produced. The range of drop sizes is known as drop spectra. Finer atomisation results in a greater number of small droplets that give greater coverage in terms of number of deposits per unit area as well as an increased area under the deposit, both of which are preferred for biological efficacy, whereas coarser atomisation results in a relatively lower number of larger droplets with fewer deposits per unit area. However, smaller droplets are more prone to drift resulting in unwanted off-target losses and generally have poorer penetration into canopies, both effects of which can be reduced by using larger, higher momentum droplets but at the cost of reducing the number of opportunities for creating deposits in the canopy being treated. During spray application of a product, however, different parts of the crop field have different requirements for drift mitigation: for example, the edges of the crop field on the downwind side have a greater risk of off-target drift outside the application area than the centre of the field or edges of the field on the upwind side. Another use case is that different weeds, either in type or in size, require different droplet sizes, or different agricultural active ingredients have their efficacy expressed differently depending on droplet size. A consequence of this is that it is advantageous to be able to adjust the droplet size continuously during application according to the optimum balance between the number of droplets per unit area required for biological performance and the off-target drift risk. Furthermore, the effects of wind on drift is also important, especially as wind is not constant but varies in all three dimensions, both in time and space, with the consequence that the optimum balance between the number of droplets per unit area and the off-target drift is continuously changing. Therefore, there is a need for a spray device that can continuously adjust its droplet size according to the location of the spray device in the target field and the current wind speed and direction, bearing in mind the biological consequences of such a change in droplet spectra. For example, in gusty conditions, quite large droplets might be needed at the edge of the field in order to control drift, but this may reduce the efficacy of the active ingredient, so a greater dose of agricultural active ingredient is required at that point. Balancing these conflicting requirements is difficult to achieve with hydraulic spray nozzles since the nozzle must be either operated at a different pressure or changed to a different orifice size in order to achieve a different spray droplet spectra, both of which take time to enable. However, with a rotating disc the droplet spectra can be almost instantaneously adjusted by changing the speed of rotation and flow rate to the disc independently from each other. However, reducing the rotation speed of spinning discs e.g., in a unmanned aerial vehicle (UAV) has two consequences: first it increases the droplet size after atomisation, as required; and second, it reduces the velocity of the droplets leaving the disc with the consequence that in particular when included with downwash from a rotor in the UAV or on an air-assisted boom sprayer, the width of the spray cone is reduced with the consequence that the width of the spray swath is reduced and any overlap created by multiple spray swaths is more variable. This is unwanted since it results in an increase in the work rate to treat the same area and a risk of untreated areas between adjacent swaths, as well as the risk of over- and underdosing. Secondly, the rotational speed of the rotors e.g., in an UAV, for example during acceleration/deceleration of the UAV while spraying and also during the reduction of mass of the UAV as the spray liquid is applied affects the amount and velocity of the downwash and subsequent width of the spray swath. Consequently, there is a need for a spray device that can continuously adjust its droplet spectra according to the location of the spray device in the target field, the current wind speed and direction and, the downwash from an UAV rotor and/or the flight height of the UAV without affecting the width of the spray cone and the width of the applied spray swath.

SUMMARY OF THE INVENTION

It would be advantageous to have improved means for the spraying of liquids such as those containing chemical and/or biological agricultural active ingredients.

The object of the present invention is solved with the subject matter of the independent claims, wherein further embodiments are incorporated in the dependent claims. It should be noted that the following described aspects and examples of the invention apply also for the spray unit, the vehicle having one or more spray unit.

In a first aspect, there is provided a spray unit. The spray unit comprises an axle, an atomising disc, a spray direction modifying assembly, and a liquid applicator. The atomising disc is configured to spin about the axle centred on the centre of the atomising disc. The liquid applicator is configured to apply liquid to a surface of the atomising disc. The spray direction modifying assembly is in proximity to the atomising disc. The spray direction modifying assembly comprises at least one air channel. The at least one air channel is configured to provide air in proximity to the atomising disc to modify the subsequent trajectory of the liquid droplets that leave the outer edge of the atomising disc.

In other words, a spray unit with an atomising disc that contains a spray direction modifying assembly that has air channels. Air flows through the air channels towards the direction of the droplets that have left the outer edge of the atomising disc and modifies the spray direction of these droplets and therefore influence the spraying swath width. Independently from this, a change in rotation speed of the atomising disc rotation changes the liquid droplet size. As a consequence thereof, the spray swath width and the liquid droplet size can be varied independently in a way that allows a constant and uniform swath width to be achieved over a wide range of spray droplet sizes. As an example, A low-volume air stream will produce a swath with a narrower width, while a high-volume air stream will produce a swath with a wider width provided that in both cases the atomising disc rotation and liquid flow and therefore the droplet size achieved during atomisation on the atomising disc are the same.

In this manner, the correct application of active ingredient per plant per unit area of land can be provided.

In an example, the spray direction modifying assembly has a disc-like form.

In an example, the spray direction modifying assembly has a disc-like form with a substantially flat geometric design whose radial extent is greater than its axial extent.

In an example, the spray direction modifying assembly is located substantially symmetrically parallel to the atomising disc.

In this way, the shape and size of the spray direction modifying assembly can be similar to the atomising disc. However, the spray direction modifying assembly obviously resumes a different technical function than the atomising disc.

In an example, the spray direction modifying assembly is at least partly double-walled and wherein the space between the two walls is configured to form the at least one air channel.

In an example, the spray direction modifying assembly comprises a plurality of substantially radially disposed air channels.

In this way, the spray direction assembly does directly influence the trajectory of all liquid droplets in a uniform and controlled manner. An air flow with a higher velocity will result in a wider spray swath, while an air flow with a lower velocity will result in a narrower spray swath.

In an example, the at least one air channel of the spray direction modifying assembly is configured to provide air in a substantially parallel direction relative to the surface of the atomising disc.

In an example, the spray direction modifying assembly is non-rotating.

In other words, the spray direction modifying assembly does not spin about the axle or a second axle but is attached to/housed within another part of the spray unit.

In a second aspect, there is provided a spray vehicle, comprising at least one spray unit according to the first aspect.

In an example, the at least one air channel of the spray direction modifying assembly is configured to provide more air into a perpendicular direction with respect to the fore-aft axis of the spray vehicle than in an aft-fore direction and a fore-aft direction.

In other words, the air flow from the spray direction modifying assembly is controlled in a manner that a wider and more uniform spray swath (in a perpendicular direction relative to the moving direction of the vehicle) is achieved with the benefit that a spray vehicle such as an UAV for example can achieve a higher or more accurate work rate.

In an example, the spray direction modifying assembly has at least one air channel and a plurality of air channel openings wherein the cross-sectional area of all air channel openings aligned spatially in a perpendicular direction relative to the fore-aft axis of the spray vehicle is greater than the cross-sectional area of all air channel openings aligned spatially in an aft-fore direction and in a fore-aft direction.

In this manner, more air volume is directed towards the direction which is perpendicular relative to the fore-aft axis of the spray vehicle (provided that the air velocity is the same for all air channels), supporting a spray sheet that has a fan shape during movement of the spray vehicle.

In an example, the spray vehicle comprises a spray direction modifying assembly that has a plurality of air channels. The air flow through the air channels aligned spatially in a perpendicular direction relative to the fore-aft axis of the spray vehicle is higher than the air flow through the air channels aligned spatially in an aft-fore direction and in a fore-aft direction.

In an example, the spray vehicle further comprises a liquid tank, at least one spray direction modifying assembly adjustment actuator, a plurality of sensors, a processing unit.

The liquid tank is configured to hold a liquid. The at least one spray unit is configured to spray a liquid. The at least one spray direction modifying assembly adjustment actuator is configured to operate and/or move the spray direction modifying assembly of the at least one spray unit. At least one sensor of the plurality of sensors is configured to measure the rotational speed of the atomising disc about the axle centred on the centre of the atomising disc. At least one sensor of the plurality of sensors is configured to measure the liquid flow rate of the liquid applicator to the surface of the atomising disc. The processing unit is configured to determine the liquid droplet size of the liquid droplets that leave the edge of the atomising disc after atomisation on the atomising disc comprising utilisation of the measured rotational speed of the atomising disc, the measured liquid flow rate of the liquid from the liquid applicator to the surface of the atomising disc, and the physico-chemical properties of the liquid. The processing unit is configured to control the at least one spray direction modifying assembly adjustment actuator, wherein determination of at least one instruction for the control of the at least one spray direction modifying assembly adjustment actuator comprises utilisation of the determined liquid droplet size.

In other words, the width of the spray cone and the width of the applied spray swath can be kept constant even though the droplet size is continuously adapted e.g., due to the location of the spray device in the target field, the current wind speed and direction, and/or e.g., the downwash from an UAV rotor and/or the flight height of an UAV.

In an example, the processing unit is configured to control the at least one spray direction modifying assembly adjustment actuator to modify the air flow through the at least one air channel of the spray direction modifying assembly wherein determination of at least one instruction for the control the at least one spray direction modifying assembly adjustment actuator comprises utilisation of the determined liquid droplet size.

In other words, controlling the air flow through the air channels is one way of modifying the air curtain and therefore influencing the subsequent trajectory of the liquid droplets leaving the atomising disc.

In an example, the processing unit is configured to control the at least one spray direction modifying assembly adjustment actuator to move the at least one air channel of the spray direction modifying assembly relative to the atomising disc wherein determination of at least one instruction for the control the at least one spray direction modifying assembly adjustment actuator comprises utilisation of the determined liquid droplet size.

In other words, changing the spatial distance of the air channel of the spray direction modifying assembly relative to the atomising disc is another way of modifying the air curtain and therefore influencing the subsequent trajectory of the liquid droplets leaving the atomising disc.

In an example, the spray vehicle further comprises a liquid tank, at least one spray direction modifying assembly adjustment actuator, a plurality of sensors, and a processing unit. The liquid tank is configured to hold a liquid. The at least one spray unit is configured to spray a liquid. The at least one spray direction modifying assembly adjustment actuator is configured to operate and/or move the spray direction modifying assembly of the at least one spray unit. At least one sensor of the plurality of sensors is configured to measure a speed of the spray vehicle relative to the ground. At least one sensor of the plurality of sensors is configured to measure an air movement direction relative to the spray vehicle with respect to a fore-aft axis of the spray vehicle. At least one sensor of the plurality of sensors is configured to measure an air movement speed relative to the spray vehicle. The processing unit is configured to determine an air movement direction relative to a projection of the fore-aft axis onto the ground and determine an air movement speed relative to the ground, the determination comprising utilisation of the speed of the spray vehicle, the air movement direction relative to the spray vehicle with respect to the fore-aft axis of the spray vehicle and the air movement speed relative to the spray vehicle. The processing unit is configured to control the rotational speed of the atomising disc, the liquid flow rate of the liquid from the liquid applicator to the surface of the atomising disc and/or the at least one spray direction modifying assembly adjustment actuator, wherein determination of at least one instruction for the control comprises utilisation of the determined air movement direction relative to the projection of the fore-aft axis onto the ground and the determined air movement speed relative to the ground.

In other words, the wind direction and speed is measured continuously and used to control the droplet size sprayed by the spray unit(s) of the spray vehicle and/or the corresponding air flow of the spray direction modifying assembly/-ies. Therefore, an optimal spraying pattern (independent of the wind conditions) can be achieved.

In an example, the spray vehicle comprises at least one sensor of the plurality of sensors configured to provide data from which the height of the spray vehicle above the ground can be determined. The processing unit is configured to control the rotational speed of the atomising disc, the liquid flow rate of the liquid from the liquid applicator to the surface of the atomising disc and/or the at least one spray direction modifying assembly adjustment actuator. The determination of at least one instruction for the control comprises utilisation of the determined air movement direction relative to the projection of the fore-aft axis onto the ground, the determined air movement speed relative to the ground and the determined height of the spray vehicle above the ground.

Thus, the height of the spray vehicle above the ground is taken into account for determining the liquid droplet size and spraying pattern of the spray vehicle.

Advantageously, the benefits provided by any of the above aspects equally apply to all of the other aspects and vice versa.

The above aspects and examples will become apparent from and be elucidated with reference to the embodiments described hereinafter.

BRIEF DESCRIPTION OF THE DRAWINGS

Exemplary embodiments will be described in the following with reference to the following drawings:

FIG. 3a shows a schematic setup of an example of a circular disc-like spray direction modifying assembly with a plurality of air channels and corresponding air channel openings from a top view perspective;

FIG. 3b shows a schematic setup of another example of a circular disc-like spray direction modifying assembly with a plurality of air channels and air channel openings from a top view perspective;

FIG. 9 shows a schematic example of a spray vehicle with a spray unit and a spray direction modifying assembly located in different positions relative to the atomising disc.

DETAILED DESCRIPTION OF EMBODIMENTS

Figure 1A:
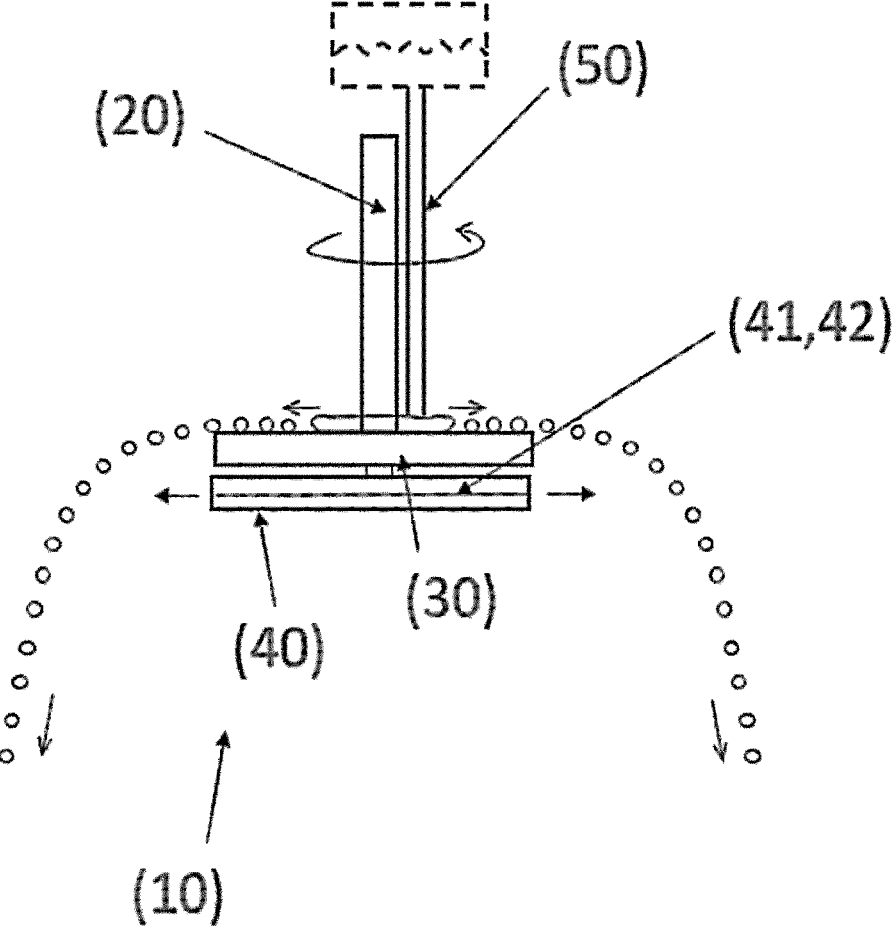
FIG. 1a shows a schematic setup of an example of a newly developed spray unit.

FIG. 1a shows an example of a spray unit 10. The spray unit comprises an axle 20, an atomising disc 30, a spray direction modifying assembly 40, and a liquid applicator 50. The atomising disc is configured to spin about the axle centred on the centre of the atomising disc. The liquid applicator is configured to apply liquid to a surface of the atomising disc. The spray direction modifying assembly is in proximity to the atomising disc. The spray direction modifying assembly comprises at least one air channel 41. The at least one air channel is configured to provide air in proximity to the atomising disc to modify the subsequent trajectory of the liquid droplets that leave the outer edge of the atomising disc.

In this manner, the spray direction modifying assembly of the spray unit does influence the spraying swath width. The spray direction modifying assembly is located in proximity to the atomising disc and directs via the generation of an air stream the atomised droplets from the atomising disc in the desired direction. As a result, the correct application of active ingredient per unit area of land can be more easily provided.

It is noted that the term "atomised" or "atomising" does not mean individual atoms, but relates to the standard us of this term with respect to spray systems, meaning a fine mist of particles that can range in sizes.

In an example, the term "atomising disc" refers to a flat atomising disc but also includes cone shaped atomising discs.

In an example, the atomising disc comprises teeth or serrations set into the periphery of the atomising disc.

In an example, the liquid applicator comprises at least one feed pipe. The feed pipe is configured to transfer liquid from a liquid tank to the atomising disc and to apply the liquid on the atomising disc.

In an example, the liquid applicator comprises at least one liquid tank and at least one feed pipe.

In an example, the term "the spray direction modifying assembly is in proximity to the atomising disc" refers to the spray direction modifying assembly being located beneath and/or above the atomising disc. Preferably, the spray modifying assembly is located beneath the atomising disc. In this case it is closer to the ground in comparison to the location of the atomising disc.

In an example, the term "at least one air channel configured to provide air in proximity to the atomising disc" refers to a location of the at least one air channel to enable air from the at least one air channel to be directed towards the liquid droplets that leave the outer edge of the atomising disc such that the trajectory of these liquid droplets can be modified (which is in proximity to the atomising disc).

In an example, the spray direction modifying assembly is configured to modify the trajectory of all liquid droplets that leave the outer edge of the atomising disc.

In an example, the term "liquid(s)" refer(s) to liquid(s) comprising chemical and/or biological based agricultural active ingredients such as e.g. herbicides, insecticides, fungicides, crop nutritional agents, biostimulants, plant growth regulators, etc.

In an example, the "at least one air channel" is configured to provide air in all directions around the atomising disc. In an example, there is "at least one air channel opening 42" which goes around (circumferentially) the lateral side of the spray direction modifying assembly.

In an example, the arrow close to the axle indicates a potential rotation direction of the axle and the atomising disc. The rotation can also be clockwise.

In an example, the arrows above the plane surface of the atomising disc indicate the direction of the centrifugal force and the atomisation of the liquid.

In an example, the arrows lateral to the spray direction modifying assembly indicate the direction of the air flow.

In an example, the spray direction modifying assembly can have any reasonable shape as long it does not interfere with its function.

According to an example, the spray direction modifying assembly has a disc-like form.

According to an example, the spray direction modifying assembly has a disc-like form with a substantially flat geometric design of the spray direction modifying assembly whose radial extent is greater than its axial extent.

In an example, the term "disc-like" describes designs with circular, oval, and elliptical radial cross sections.

In an example, the term "substantially flat geometric design" refers to the spray direction modifying assembly that may have structural elevations or depressions both in the axial and in the radial direction.

In an example, the spray direction modifying assembly has a circular disc form.

In an example, the spray direction modifying assembly disc has a diameter of 100 to 1000 mm, more preferably a diameter of 20 to 100 mm, and especially preferred a diameter of 40 to 80 mm.

According to an example, the spray direction modifying assembly is located substantially symmetrically parallel to the atomising disc.

In an example, the spray direction modifying assembly is axially spaced to the atomising disc. In an example, the axial space between the atomising disc and the direction modifying assembly is between 0.1 mm and 40 mm, preferably 0.5 mm to 20 mm.

In an example, more than one spray direction modifying assemblies are axially spaced to the atomising disc and stacked on top of each other either below or above the atomising disc, or one or more spray direction modifying assembly/-ies is/are located above and one or more spray modifying assembly/-ies is/are located below the atomising disc.

In an example, the more than one spray direction modifying assemblies are configured to provide air in proximity to the atomising disc according to different air flow patterns.

In this manner, the air flow can be continuously adjusted by switching between the different spray direction modifying assemblies and their corresponding air flow pattern.

According to an example, the spray direction modifying assembly is at least partly double-walled. The space between the two walls is configured to form the at least one air channel 41.

In an example, at least one of the two walls of the spray direction modifying assembly is configured to move in parallel relative to the other wall to decrease or increase the distance between the at least two walls. Thus, by changing the distance between the two walls of the spray direction modifying assembly, the air flow going through the air channel (while keeping the air velocity constant) can be changed and controlled.

In an example, the spray direction modifying assembly comprises at least one wall-moving actuator configured to move at least one wall in parallel relative to the other wall of the air channel to decrease or increase the distance between the at least two walls.

Figure 1B:
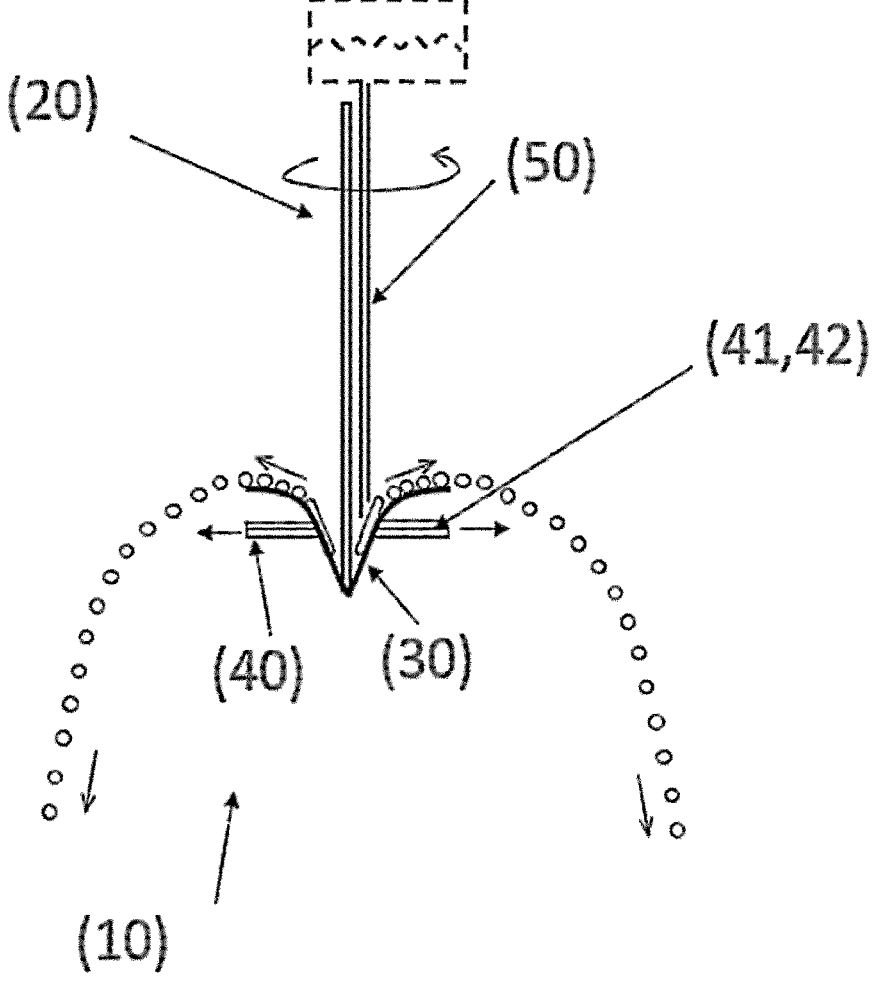
FIG. 1b shows the example of the spray unit according to FIG. 1a with a cone shaped atomising disc.

FIG. 1b shows the example of the spray unit 10 according to FIG. 1a with a cone shaped atomising disc 30. The spray direction modifying assembly 40 is shown as a slotted disc wherein a part of the cone shaped atomising disc is located within the slotted disc. The arrows depicted in FIG. 1b have a similar meaning as described in context with FIG. 1a.

Figure 2A:
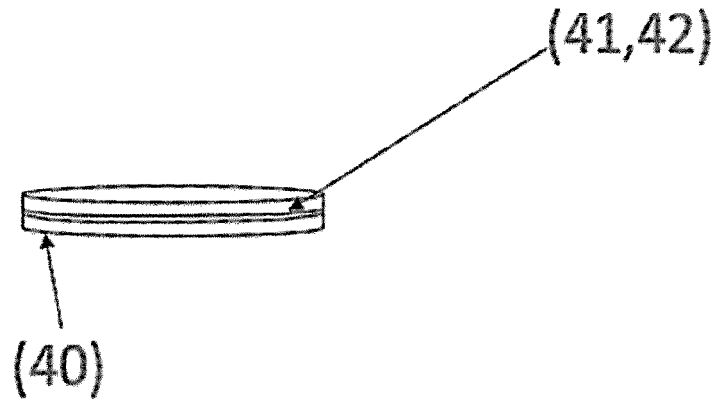
FIG. 2a shows a schematic setup of an example of a circular disc-like spray direction modifying assembly with one air channel from a side perspective.

FIG. 2a shows a schematic setup of an example of a circular disc-like spray direction modifying assembly 40 with one air channel 41 from a side perspective. In this example, the spray direction modifying assembly has one air channel opening 42 which goes around (circumferentially) on the lateral side of the spray direction modifying assembly disc.

Figure 2B:
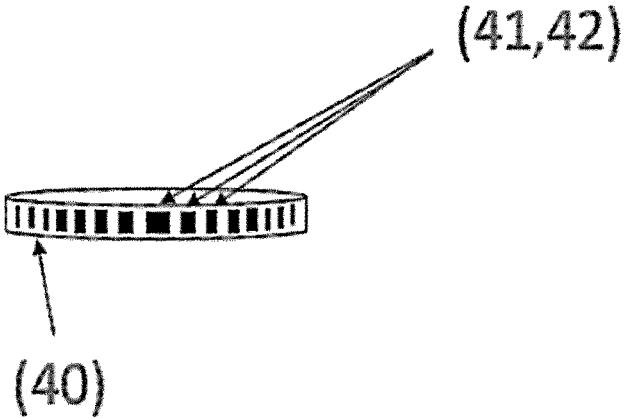
FIG. 2b shows a schematic setup of an example of a circular disc-like spray direction modifying assembly with a plurality of air channel openings from a side view perspective.

FIG. 2b shows a schematic setup of an example of a circular disc-like spray direction modifying assembly 40 with at least one air channel 41 (not visible) and a plurality of air channel openings 42 from a side view perspective.

FIG. 3a shows a schematic setup of an example of a circular disc-like spray direction modifying assembly 40 with a plurality of air channels 41 and corresponding air channel openings 42 from a top view perspective. The dotted lines indicate that the air channels may not be visible from the outside of the spray direction modifying assembly.

According to an example, the spray direction modifying assembly comprises a plurality of substantially radially disposed air channels 41.

In an example, the substantially radially disposed air channels 41 have corresponding air channel openings 42.

In an example, the one or more air channel opening is on the lateral side of the atomising disc.

FIG. 3b shows a schematic setup of another example of a circular disc-like spray direction modifying assembly 40 with a plurality of air channels 41 and air channel openings 42 from a top view perspective. The dotted lines indicate that the air channels may not be visible from the outside of the spray direction modifying assembly.

In an example, the plurality of substantially radially disposed air channels 41 are straight, curved, symmetrical and/or asymmetrical.

In an example, a circular disc-like spray direction modifying assembly has substantially radially disposed air channels 41 and/or air channel openings 42. The cross-sectional area of all air channel openings 42 aligned spatially in a perpendicular direction (west and east) is greater than the cross-sectional area of all air channel openings aligned in the north and south direction. This is beneficial when the spray unit 10 is moved in the direction of travel (as indicated in FIG. 3b) in order to generate the intended spray swath.

Figure 4:
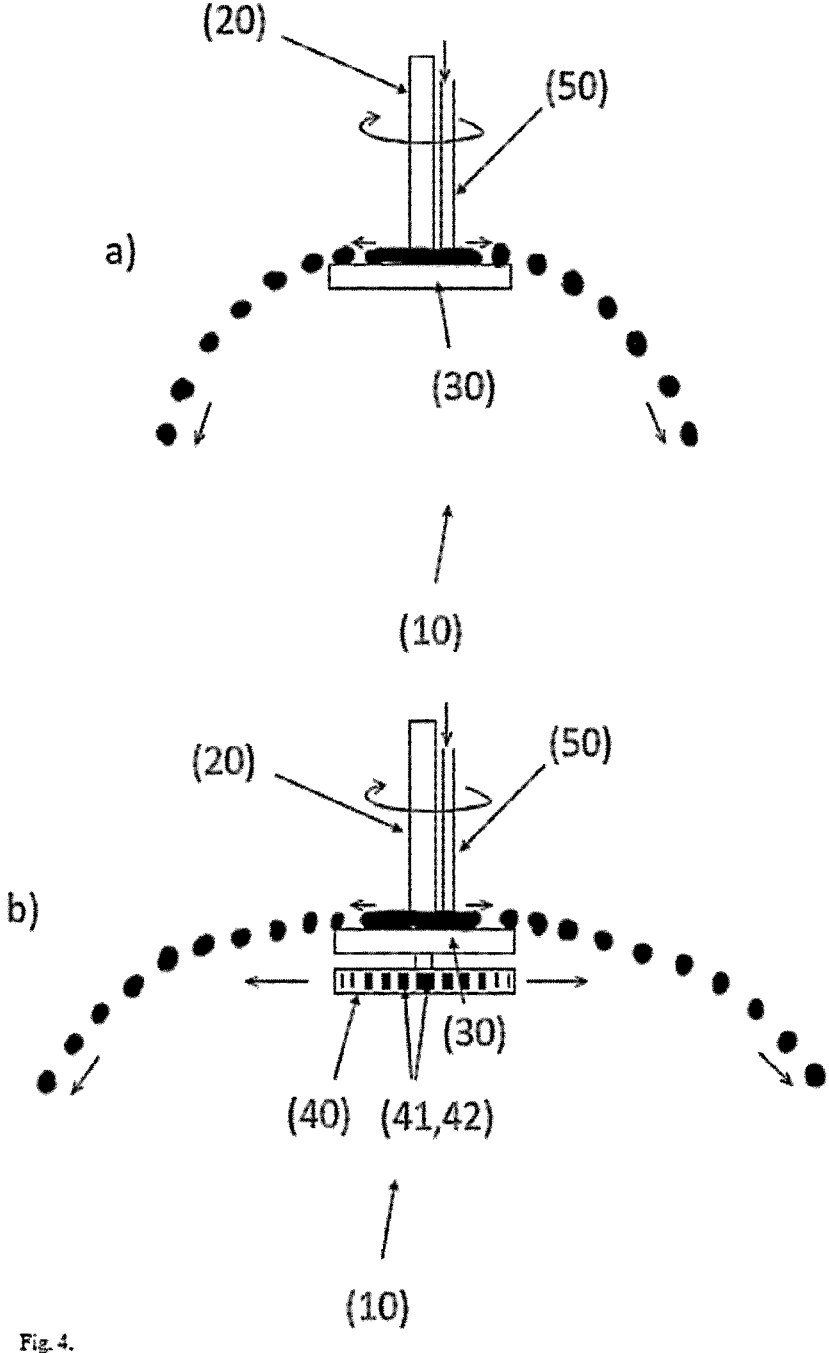
FIG. 4 shows a comparison of the spray swath from a spray unit with and without a spray direction modifying assembly.

FIG. 4 shows a comparison of the spray swath from a spray unit 10 with and without a spray direction modifying assembly 40. In example a) a spray unit 10 with an axle 20, an atomising disc 30 and liquid applicator 50 but without a spray direction modifying assembly is depicted. In example b), a spray unit 10, with an axle 20, an atomising disc 40 and a liquid applicator 50 is shown. The spray unit according to this example also comprises a spray direction modifying assembly 40 which has at least one air channel 41 and a plurality of air channel openings 42. The air from the air channel 41 modifies the direction of the liquid droplets that leave the edge of the atomising disc. In example b) the spray swath is broader in comparison to the spray swath according to example a) provided that the rotation of the atomising disc, the liquid flow rate and the liquid for both examples is the same.

In an example, the arrows in example a) and b) are like those explained in connection with FIG. 1.

According to an example, the at least one air channel 41 of the spray direction modifying assembly 40 are configured to provide air in a substantially parallel direction relative to the surface of the atomising disc.

As shown in example b) of FIG. 4 this is a way to modify the subsequent trajectory of the liquid droplets that leave the outer edge of the atomising disc.

According to an example, the spray direction modifying assembly is non-rotating.

In an example, the spray direction modifying assembly is attached to/housed within a body of the spray unit which is not the axle or the atomising disc.

In an example, the spray unit can be used for boom sprayers, UAVs, Unmanned Ground Vehicles (UGV), robotics platforms, and back-pack sprayers.

Figure 5:
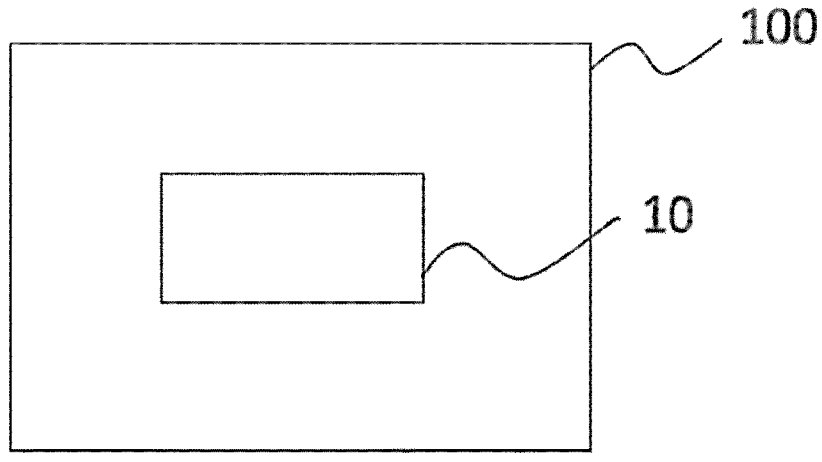
FIG. 5 shows a schematic example of a spray vehicle with a spray unit.

FIG. 5 shows a schematic example of a spray vehicle 100 with a spray unit 10.

In an example, the vehicle is a drone or UAV.

In an example, the vehicle is a land vehicle such as an Unmanned Ground Vehicles (UGV), a robotic platform, tractor.

According to an example, the at least one air channel 41 of the spray direction modifying assembly is configured to provide more air into a perpendicular direction with respect to the fore-aft axis of the spray vehicle than in an aft-fore direction and a fore-aft direction.

In an example, the term "provide more air" refers to the air volume flow for a certain time period.

In an example, there are a plurality of air channels 41 with corresponding air channel openings 42.

According to an example, the spray direction modifying assembly has at least one air channel 41 and a plurality of air channel openings 42 wherein the cross-sectional area of all air channel openings 42 aligned spatially in a perpendicular direction relative to the fore-aft axis of the spray vehicle is greater than the cross-sectional area of all air channel openings aligned spatially in a aft-fore direction and in an fore-aft direction.

According to an example, the spray direction modifying assembly has a plurality of air channels 41 and wherein the air flow through the air channels aligned spatially in a perpendicular direction relative to the fore-aft axis of the spray vehicle is higher than the air flow through the air channels aligned spatially in a aft-fore direction and in an fore-aft direction.

It has to be noted that the "air flow" which is the "air volume flow/time unit" can be calculated by multiplying the air velocity by the cross-sectional area of the air channel for a certain time unit.

Figure 6:
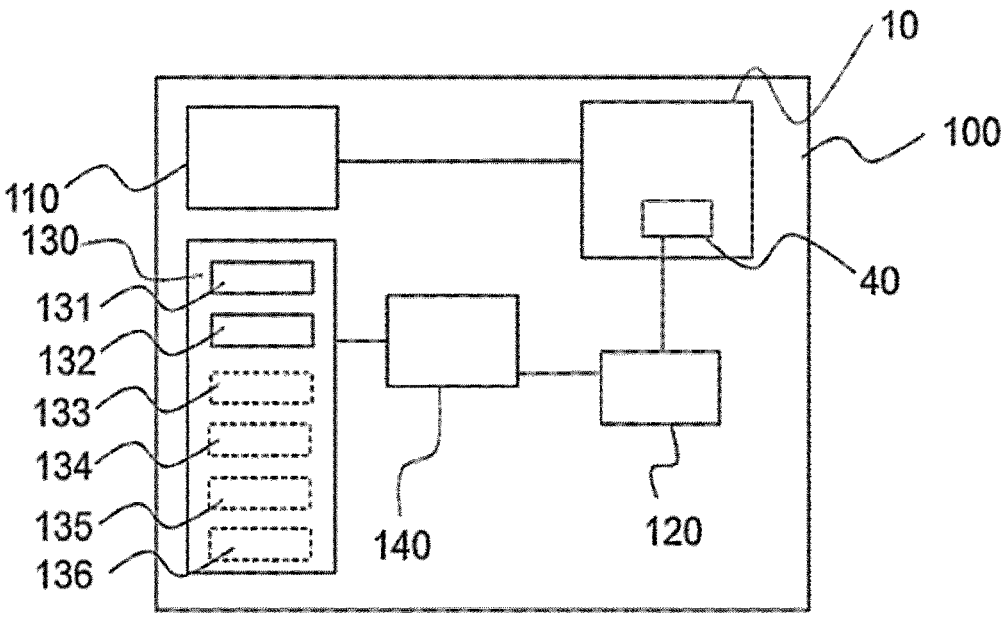
FIG. 6 shows a schematic example of a spray vehicle with a spray unit and the control of the air flow through the spray direction modifying assembly.

FIG. 6 shows a schematic example of a spray vehicle 100 with a spray unit 10 and the control of the air flow through the spray direction modifying assembly 40. The spray vehicle further comprises a liquid tank 110, at least one spray direction modifying assembly adjustment actuator 120, a plurality of sensors 130 and a processing unit 140. The liquid tank is configured to hold a liquid. The at least one spray unit is configured to spray a liquid. The at least one spray direction modifying assembly adjustment actuator is configured to operate and/or move the spray direction modifying assembly of the at least one spray unit. At least one sensor 131 of the plurality of sensors is configured to measure the rotational speed of the atomising disc 30 about the axle 20 centred on the centre of the atomising disc. At least one sensor 132 of the plurality of sensors is configured to measure the liquid flow rate of the liquid applicator 50 to the surface of the atomising disc 30. The processing unit is configured to determine the liquid droplet size of the liquid droplets that leave the edge of the atomising disc after atomisation on the atomising disc comprising utilisation of the measured rotational speed of the atomising disc, the measured liquid flow rate of the liquid from the liquid applicator to the surface of the atomising disc, and the physico-chemical properties of the liquid. The processing unit is configured to control the at least one spray direction modifying assembly adjustment actuator, wherein determination of at least one instruction for the control of the at least one spray direction modifying assembly adjustment actuator comprises utilisation of the determined liquid droplet size.

In an example, the at least one sensor 131 configured to measure the rotational speed of the atomising disc about the axle comprises a tachometer (RPM gauge).

In an example, the at least one sensor 132 configure to measure the liquid flow rate of the liquid applicator to the surface of the atomising disc is a rotameter or equivalent.

In an example, the processing unit is configured to control the at least one spray direction modifying assembly adjustment actuator, wherein determination of at least one instruction for the control of the at least one spray direction modifying assembly adjustment actuator comprises utilisation of the determined liquid droplet size, the measured rotational speed of the atomising disc, the measured liquid flow rate of the liquid from the liquid applicator to the surface of the atomising disc, and the physico-chemical properties of the liquid.

In an example, the processing unit is configured to determine the liquid droplet spectra of the liquid droplets that leave the edge of the atomising disc and the processing unit is configured to control the at least one spray direction modifying assembly adjustment actuator, wherein determination of at least one instruction for the control of the at least one spray direction modifying assembly adjustment actuator comprises utilisation of the determined liquid droplet spectra.

The term "liquid droplet spectra" refers to the liquid droplet size distribution.

In an example, the spray vehicle further comprises an input unit configured to receive data of the physico-chemical properties of the liquid. The input unit is configured to provide the processing unit with the information about the physico-chemical properties of the liquid. As an example, the physico-chemical properties of the liquid can be encoded in a QR code on the packaging of the liquid which can be scanned e.g. by an input unit of the spray vehicle.

According to an example, the processing unit is configured to control the at least one spray direction modifying assembly adjustment actuator to modify the air flow through the at least one air channel of the spray direction modifying assembly wherein determination of at least one instruction for the control the at least one spray direction modifying assembly adjustment actuator comprises utilisation of the determined liquid droplet size.

In an example, the processing unit is configured to control the at least one spray direction modifying assembly adjustment actuator to modify the air flow through the at least one air channel of the spray direction modifying assembly wherein determination of at least one instruction for the control the at least one spray direction modifying assembly adjustment actuator comprises utilisation of the determined liquid droplet size, the measured rotational speed of the atomising disc, the measured liquid flow rate of the liquid from the liquid applicator to the surface of the atomising disc, and the physico-chemical properties of the liquid.

According to an example, the processing unit is configured to control the at least one spray direction modifying assembly adjustment actuator to move the at least one air channel of the spray direction modifying assembly relative to the atomising disc wherein determination of at least one instruction for the control the at least one spray direction modifying assembly adjustment actuator comprises utilisation of the determined liquid droplet size.

According to an example, the processing unit is configured to control the at least one spray direction modifying assembly adjustment actuator to move the at least one air channel of the spray direction modifying assembly relative to the atomising disc wherein determination of at least one instruction for the control the at least one spray direction modifying assembly adjustment actuator comprises utilisation of the determined liquid droplet size, the measured rotational speed of the atomising disc, the measured liquid flow rate of the liquid from the liquid applicator to the surface of the atomising disc, and the physico-chemical properties of the liquid.

According to an example, at least one sensor 133 of the plurality of sensors is configured to measure a speed of the spray vehicle relative to the ground and at least one sensor 134 of the plurality of sensors is configured to measure an air movement direction relative to the spray vehicle with respect to a fore-aft axis of the spray vehicle, at least one sensor 135 of the plurality of sensors is configured to measure an air movement speed relative to the spray vehicle, wherein the processing unit is configured to determine an air movement direction relative to a projection of the fore-aft axis onto the ground and determine an air movement speed relative to the ground, the determination comprising utilisation of the speed of the spray vehicle, the air movement direction relative to the spray vehicle with respect to the fore-aft axis of the spray vehicle and the air movement speed relative to the spray vehicle and wherein the processing unit is configured to control the rotational speed of the atomising disc, the liquid flow rate of the liquid from the liquid applicator to the surface of the atomising disc and/or the at least one spray direction modifying assembly adjustment actuator, wherein determination of at least one instruction for the control comprises utilisation of the determined air movement direction relative to the projection of the fore-aft axis onto the ground and the determined air movement speed relative to the ground.

According to an example, the spray vehicle further comprises at least one sensor 136 of the plurality of sensors configured to provide data from which the height of the spray vehicle above the ground can be determined. The processing unit is configured to control the rotational speed of the atomising disc, the liquid flow rate of the liquid from the liquid applicator to the surface of the atomising disc and/or the at least one spray direction modifying assembly adjustment actuator, wherein determination of at least one instruction for the control comprises utilisation of the determined air movement direction relative to the projection of the fore-aft axis onto the ground, the determined air movement speed relative to the ground and the determined height of the spray vehicle above the ground.

In an example, the at least one sensor 133 configured to measure a speed of the spray vehicle relative to the ground comprises a GPS system.

In an example, the at least one sensor 133 configured to measure a speed of the spray vehicle relative to the ground comprises a laser reflectance based system.

In an example, the at least one sensor 134 configured to measure an air movement direction relative to the spray vehicle comprises a wind vane.

In an example, the at least one sensor 135 configured to measure an air movement speed relative to the spray vehicle comprises an 2D or 3D sonic anemometer.

In an example, the at least one sensor 135 configured to measure an air movement speed relative to the spray vehicle comprises a pitot tube.

In an example, the at least one sensor 134 and 135 configured to measure an air movement direction, speed (and distance) relative to the spray vehicle comprises a LIDAR sensor, preferably a Doppler LIDAR sensor.

In an example, the sensor 136 used to determine height is a radar sensor.

In an example, the sensor 136 used to determine height is a laser time of flight sensor.

In an example, at least one spray direction modifying assembly adjustment actuator refers to at least one mechanical device that converts energy into motion. The source of energy may be, for example, an electric current, hydraulic fluid pressure, pneumatic pressure, mechanical energy, thermal energy, or magnetic energy. For example, an electric motor assembly may be a type of actuator that converts electric current into a rotary motion, and may further convert the rotary motion into a linear motion to execute movement. In this way, an actuator may include a motor, gear, linkage, wheel, screw, pump, piston, switch, servo, or other element for converting one form of energy into motion.

Figure 7:
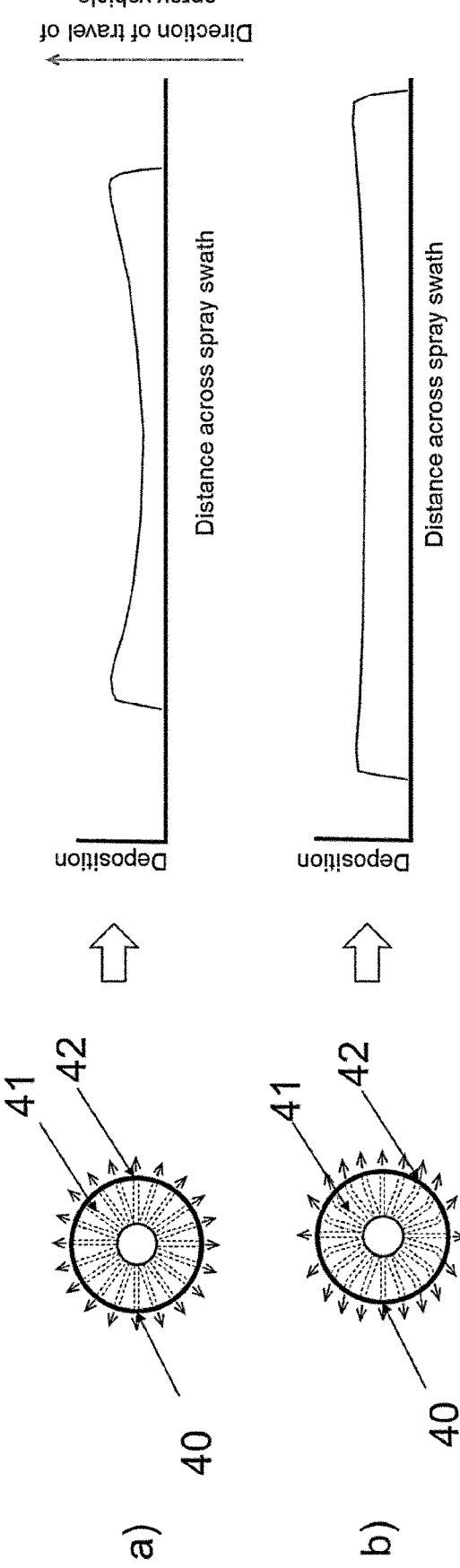
FIG. 7 shows a schematic example of spray vehicles with different spray units and their corresponding spray swaths.

FIG. 7 shows a schematic example of spray vehicles each with one different spray unit and their corresponding spray swaths. The spray vehicle in example a) the spray vehicle does comprise a spray unit 10 with an atomising disc 30 and a spray direction modifying assembly 40 with radially disposed air channels 41 and corresponding air channel openings 42 that are symmetrical. The same amount of air volume flow per time is provided in all directions of the spray direction modifying assembly. In example b), the spray vehicle does comprise a spray unit with an atomising disc 30 and a spray direction modifying assembly 40 with a plurality of air channels 41 and corresponding air channel openings 42 wherein the spray direction modifying assembly is configured to provide more air into a perpendicular direction with respect to the fore-aft axis of the spray vehicle than in an aft-fore direction and a fore-aft direction. The spray swath is very uniform across the whole distance of the spray swath.

Figure 8:
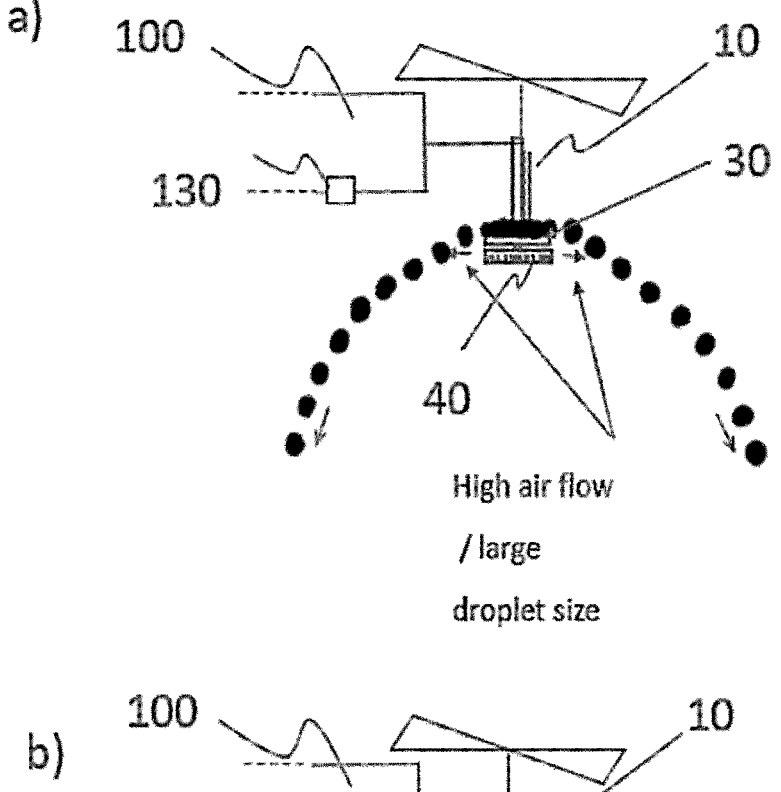
FIG. 8 shows a schematic example of a spray vehicle with a spray unit and the control of the air flow through the spray direction modifying assembly as a function of generating different liquid droplet sizes.

FIG. 8 shows a schematic example of a spray vehicle 100 with a spray unit 10 and the control of the air flow through the spray direction modifying assembly as a function of generating different droplet sizes. In this example, the spray vehicle is a UAV and does comprise at least one spray unit located beneath a propeller unit of the UAV. The spray unit does comprise a spray direction assembly 40 with a disc-like spray direction modifying assembly. The plurality of sensors 130 measure—among other factors—the rotation of the atomising disc and the liquid flow from the liquid applicator to the surface of the atomising disc. The processing unit (not shown) determines the liquid droplet size of the liquid droplets that leave the edge of the atomising disc after atomisation on the atomising disc. The processing unit further uses the sensed and calculated information in order to instruct the at least one spray direction modifying assembly adjustment actuator (not shown) to control the air flow from the spray direction modifying assembly towards the spraying direction.

In an alternative example, an appropriate liquid droplet size or spectra could have been calculated by the processing unit with the information of the determined air movement (wind) direction relative to the projection of the fore-aft axis of the spray vehicle onto the ground, the determined air movement (wind) speed of the spray vehicle relative to the ground and the determined height of the spray vehicle above the ground. In order to achieve the appropriate liquid droplet size or spectra and an appropriate spraying pattern, the processing unit controls the rotational speed of the atomising disc, the liquid flow rate of the liquid from the liquid applicator to the surface of the atomising disc and/or the at least one spray direction modifying assembly adjustment actuator.

In the example of FIG. 8 *a*) the droplet size of the atomised liquid that leaves the edge of the atomising disc is large (and the rotation speed of the atomising disc is low) and a high-air flow flows from the spray direction modifying assembly towards the liquid droplets that leave the edge of the atomising disc 30 (the air flow is indicated with arrows next to the spray direction modifying assembly and the air flow is substantially parallel relative to the surface of the atomising disc). In example of FIG. 8 *b*) the droplet size of the atomised liquid that leaves the edge of the atomising disc is small (and the rotation speed of the atomising disc is high) and a low-air flow flows from the spray direction modifying assembly towards the liquid droplets that leave the edge of the atomising disc 30 which results in a spray swath width that is similar to the spray swath width according to example a) (however, the liquid droplet spectra is different).

FIG. 9 shows a schematic example of a spray vehicle 100 with a spray unit 10 and a spray direction modifying assembly 40 located in different positions relative to the atomising disc 30. In this example, the spray vehicle is a UAV and does comprise at least one spray unit located beneath a propeller unit of the UAV. In example a) the atomising disc is below the spray direction modifying assembly. In this example, the air flow of the spray direction modifying assembly (indicated with thick arrows on the lateral side of the spray direction modifying assembly) can compensate the downwash airstream (also indicated with thick arrows) from the propeller unit of the UAV. In example b) the atomising disc is above the spray direction modifying assembly. Here, again, the air flow from the spray direction modifying assembly mitigates the downwash airstream from the propeller unit of the UAV.

It has to be noted that embodiments of the invention are described with reference to different subject matters. In particular, some embodiments are described with reference to spray unit type claims whereas other embodiments are described with reference to spray vehicle type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

What is claimed is:

1. A spray unit, comprising:
   an axle;
   an atomizing disc;
   a spray direction modifying assembly;
   a liquid applicator;
   wherein, the atomizing disc is configured to spin about the axle centered on a center of the disc;
   wherein, the liquid applicator is configured to apply liquid to a surface of the atomizing disc, and wherein the atomizing disc is configured to form atomized liquid droplets from the liquid applied to the surface of the atomizing disc;
   wherein the spray direction modifying assembly is in proximity to the atomizing disc;
   wherein the spray direction modifying assembly comprises at least one air channel; and
   wherein the at least one air channel is configured to provide air in proximity to the atomizing disc in a direction perpendicular to the axle, to modify a subsequent trajectory of the liquid droplets that leave an outer edge of the atomizing disc.

2. The spray unit according to claim 1, wherein the spray direction modifying assembly has a disc-like form.

3. The spray unit according to claim 1, wherein the spray direction modifying assembly has a form with a substantially flat geometric design whose radial extent is greater than its axial extent.

4. The spray unit according to claim 1, wherein the spray direction modifying assembly is located substantially symmetrically parallel to the atomizing disc.

5. The spray unit according to claim 1, wherein the spray direction modifying assembly is at least partly double-walled and wherein a space between the two walls is configured to form the at least one air channel.

6. The spray unit according to claim 1, wherein the spray direction modifying assembly comprises a plurality of substantially radially disposed air channels.

7. The spray unit according to claim 1, wherein the at least one air channel of the spray direction modifying assembly is configured to provide air in a substantially parallel direction relative to the surface of the atomizing disc.

8. The spray unit according to claim 1, wherein the spray direction modifying assembly is non-rotating.

9. A spray vehicle, comprising the spray unit according to claim 1.

10. The spray vehicle according to claim 9, wherein the at least one air channel of the spray direction modifying assembly is configured to provide more air into a perpendicular direction with respect to a fore-aft axis of the spray vehicle than in an aft-fore direction and a fore-aft direction.

11. The spray vehicle according to claim 10, wherein the at least one air channel of the spray direction modifying assembly has a plurality of air channel openings, wherein a cross-sectional area of all air channel openings aligned spatially in a perpendicular direction relative to the fore-aft axis of the spray vehicle is greater than a cross-sectional area of all air channel openings aligned spatially in a aft-fore direction and in an fore-aft direction.

12. The spray vehicle according to claim 10, wherein the spray direction modifying assembly has a plurality of air channels, and wherein air flow through the air channels aligned spatially in a perpendicular direction relative to the fore-aft axis of the spray vehicle is higher than air flow through the air channels aligned spatially in an aft-fore direction and in a fore-aft direction.

13. The spray vehicle according to claim 9, further comprising:
a liquid tank;
at least one spray direction modifying assembly adjustment actuator;
a plurality of sensors;
a processing unit;
wherein, the liquid tank is configured to hold a liquid;
wherein, the at least one spray unit is configured to spray a liquid;
wherein, the at least one spray direction modifying assembly adjustment actuator is configured to operate and/or move the spray direction modifying assembly of the at least one spray unit;
wherein at least one sensor of the plurality of sensors is configured to measure a speed of the spray vehicle relative to the ground;
wherein, at least one sensor of the plurality of sensors is configured to measure an air movement direction relative to the spray vehicle with respect to a fore-aft axis of the spray vehicle;
wherein, at least one sensor of the plurality of sensors is configured to measure an air movement speed relative to the spray vehicle;

16 wherein the processing unit is configured to determine an air movement direction relative to a projection of the fore-aft axis onto the ground and determine an air movement speed relative to the ground, the determination comprising utilization of the speed of the spray vehicle, the air movement direction relative to the spray vehicle with respect to the fore-aft axis of the spray vehicle and the air movement speed relative to the spray vehicle; and
wherein, the processing unit is configured to determine at least one instruction for control of a rotational speed of the atomizing disc, a liquid flow rate of the liquid from the liquid applicator to the surface of the atomizing disc and/or the at least one spray direction modifying assembly adjustment actuator, wherein determination of the at least one instruction for the control comprises utilization of the determined air movement direction relative to the projection of the fore-aft axis onto the ground and the determined air movement speed relative to the ground.

14. The spray vehicle according to claim 13, wherein at least one sensor of the plurality of sensors is configured to provide data from which a height of the spray vehicle above the ground can be determined; and
wherein, the processing unit is configured to control the rotational speed of the atomizing disc, the liquid flow rate of the liquid from the liquid applicator to the surface of the atomizing disc and/or the at least one spray direction modifying assembly adjustment actuator, wherein, determination of the at least one instruction for the control comprises utilization of the determined air movement direction relative to the projection of the fore-aft axis onto the ground, the determined air movement speed relative to the ground and the determined height of the spray vehicle above the ground.

15. The spray vehicle according to claim 9, further comprising:
a liquid tank;
at least one spray direction modifying assembly adjustment actuator;
a plurality of sensors;
a processing unit;
wherein, the liquid tank is configured to hold a liquid;
wherein, the at least one spray unit is configured to spray a liquid;
wherein, the at least one spray direction modifying assembly adjustment actuator is configured to operate and/or move the spray direction modifying assembly of the at least one spray unit;
wherein, at least one sensor of the plurality of sensors is configured to measure a rotational speed of the atomizing disc about the axle centered on the center of the atomizing disc;
wherein, at least one sensor of the plurality of sensors is configured to measure a liquid flow rate of the liquid applicator to the surface of the atomizing disc;
wherein, the processing unit is configured to determine a liquid droplet size of the liquid droplets that leave the edge of the atomizing disc after atomization on the atomizing disc comprising utilization of the measured rotational speed of the atomizing disc, the measured liquid flow rate of the liquid from the liquid applicator to the surface of the atomizing disc, and the physico-chemical properties of the liquid; and
wherein, the processing unit is configured to determine at least one instruction for control of the at least one spray direction modifying assembly adjustment actuator, wherein determination of the at least one instruction for the control of the at least one spray direction modifying assembly adjustment actuator comprises utilization of the determined liquid droplet size.

16. The spray vehicle according to claim 15, wherein the processing unit is configured to control the at least one spray direction modifying assembly adjustment actuator to modify air flow through the at least one air channel of the spray direction modifying assembly, wherein determination of at least one instruction for the control the at least one spray direction modifying assembly adjustment actuator comprises utilization of the determined liquid droplet size.

17. The spray vehicle according to claim 15, wherein the processing unit is configured to control the at least one spray direction modifying assembly adjustment actuator to move the at least one air channel of the spray direction modifying assembly relative to the atomizing disc, wherein determination of at least one instruction for the control of the at least one spray direction modifying assembly adjustment actuator comprises utilization of the determined liquid droplet size.

18. A spray vehicle, comprising:
a spray unit, wherein the spray unit includes:
an axle;
an atomizing disc;
a spray direction modifying assembly; and
a liquid applicator;
  wherein, the atomizing disc is configured to spin about the axle centered on a center of the disc;
  wherein, the liquid applicator is configured to apply liquid to a surface of the atomizing disc;
  wherein the spray direction modifying assembly is in proximity to the atomizing disc;
  wherein the spray direction modifying assembly comprises at least one air channel; and
  wherein the at least one air channel is configured to provide air in proximity to the atomizing disc to modify a subsequent trajectory of liquid droplets that leave an outer edge of the atomizing disc;
a liquid tank;
at least one spray direction modifying assembly adjustment actuator;
a plurality of sensors; and
a processing unit;
  wherein, the liquid tank is configured to hold a liquid;
  wherein, the at least one spray unit is configured to spray a liquid;
  wherein, the at least one spray direction modifying assembly adjustment actuator is configured to operate and/or move the spray direction modifying assembly of the at least one spray unit;
  wherein, at least one sensor of the plurality of sensors is configured to measure a rotational speed of the atomizing disc about the axle centered on the center of the atomizing disc;
  wherein, at least one sensor of the plurality of sensors is configured to measure a liquid flow rate of the liquid applicator to the surface of the atomizing disc;
  wherein, the processing unit is configured to determine a liquid droplet size of the liquid droplets that leave the edge of the atomizing disc after atomization on the atomizing disc comprising utilization of the measured rotational speed of the atomizing disc, the measured liquid flow rate of the liquid from the liquid applicator to the surface of the atomizing disc, and the physico-chemical properties of the liquid; and wherein, the processing unit is configured to determine at least one instruction for control of the at least one spray direction modifying assembly adjustment actuator, wherein determination of the at least one instruction for the control of the at least one spray direction modifying assembly adjustment actuator comprises utilization of the determined liquid droplet size.

19. A spray vehicle, comprising:
a spray unit, wherein the spray unit includes:
an axle;
an atomizing disc;
a spray direction modifying assembly; and
a liquid applicator;
  wherein, the atomizing disc is configured to spin about the axle centered on a center of the disc;
  wherein, the liquid applicator is configured to apply liquid to a surface of the atomizing disc;
  wherein the spray direction modifying assembly is in proximity to the atomizing disc;
  wherein the spray direction modifying assembly comprises at least one air channel; and
  wherein the at least one air channel is configured to provide air in proximity to the atomizing disc to modify a subsequent trajectory of liquid droplets that leave an outer edge of the atomizing disc;
a liquid tank;
at least one spray direction modifying assembly adjustment actuator;
a plurality of sensors; and
a processing unit;
  wherein, the liquid tank is configured to hold a liquid;
  wherein, the at least one spray unit is configured to spray a liquid;
  wherein, the at least one spray direction modifying assembly adjustment actuator is configured to operate and/or move the spray direction modifying assembly of the at least one spray unit;
  wherein at least one sensor of the plurality of sensors is configured to measure a speed of the spray vehicle relative to the ground;
  wherein, at least one sensor of the plurality of sensors is configured to measure an air movement direction relative to the spray vehicle with respect to a fore-aft axis of the spray vehicle;
  wherein, at least one sensor of the plurality of sensors is configured to measure an air movement speed relative to the spray vehicle;
  wherein the processing unit is configured to determine an air movement direction relative to a projection of the fore-aft axis onto the ground and determine an air movement speed relative to the ground, the determination comprising utilization of the speed of the spray vehicle, the air movement direction relative to the spray vehicle with respect to the fore-aft axis of the spray vehicle and the air movement speed relative to the spray vehicle; and
  wherein, the processing unit is configured to determine at least one instruction for control of a rotational speed of the atomizing disc, a liquid flow rate of the liquid from the liquid applicator to the surface of the atomizing disc and/or the at least one spray direction modifying assembly adjustment actuator, wherein determination of the at least one instruction for the control comprises utilization of the determined air movement direction relative to the projection of the fore-aft axis onto the ground and the determined air movement speed relative to the ground.

* * * * *